A. WILKINSON.
Piston-Rod Packing.
No. 222,805. Patented Dec. 23, 1879.
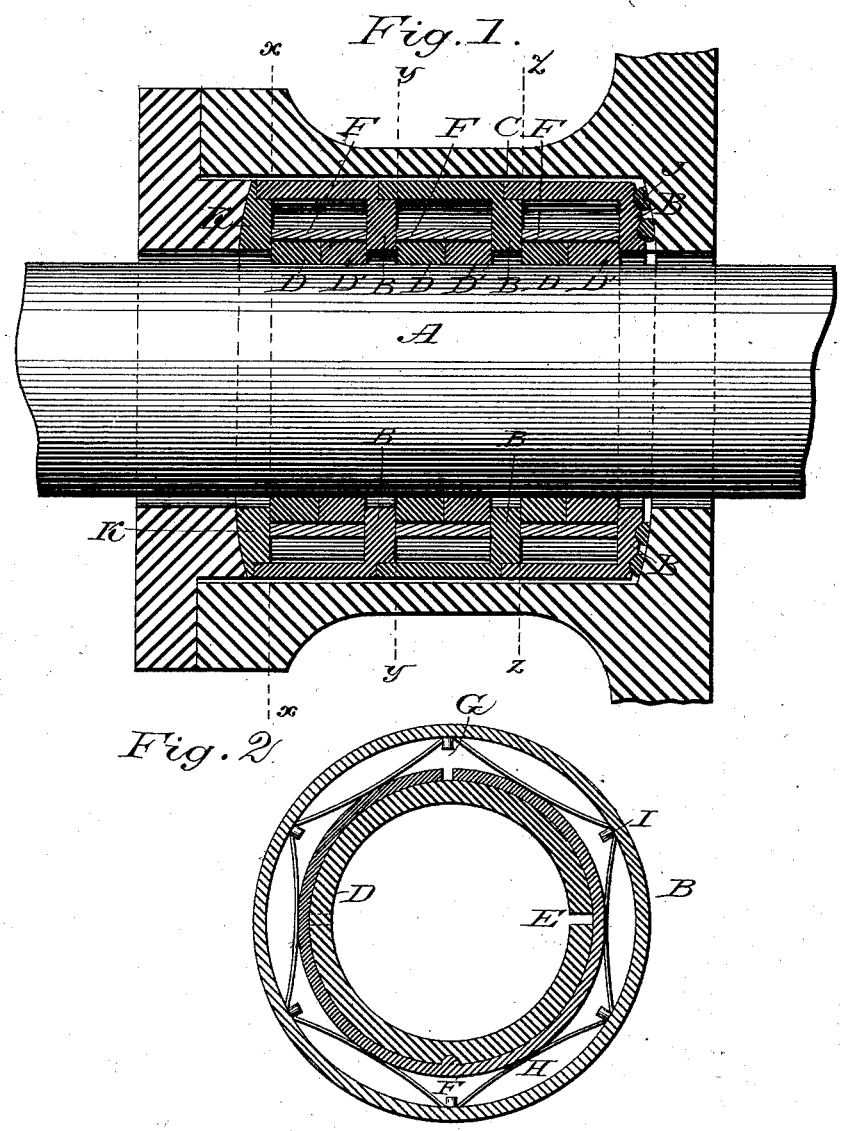

UNITED STATES PATENT OFFICE.

ALFRED WILKINSON, OF PHILADELPHIA, PENNSYLVANIA.

IMPROVEMENT IN PISTON-ROD PACKINGS.

Specification forming part of Letters Patent No. 222,805, dated December 23, 1879; application filed November 6, 1879.

*To all whom it may concern:*

Be it known that I, ALFRED WILKINSON, of the city of Philadelphia, State of Pennsylvania, have invented a new and useful Improvement in Packings for Piston-Rods, Valve-Stems, &c., of which the following is a specification.

My invention relates to piston-rod packings made entirely of metal, with the advantage of elasticity, permitting any necessary vibration of the rod with little friction, thereby enhancing its durability.

Heretofore piston-rods have been packed either with fibrous material incorporated with rubber, plumbago, soap-stone, &c., or with metal followed with one or two rings of fibrous material, or with metal subject to a steam-pressure corresponding with that in the cylinder.

The first method is objectionable by reason of excessive friction on the rod, and requiring constant renewal, and the fluting or grooving of the rod.

The second method is objectionable because of the rigidity of the packing, permitting little or no vibration of the rod.

The third method is objectionable for the reason that the steam-pressure is utilized in making a joint, creating friction in proportion to said steam-pressure—*e. g.*, pressure not being concomitant with a tight joint, as illustrated in the balanced slide-valve.

The object of my invention is to construct a packing entirely of metal, permitting any necessary vibration of the rod free from the action of steam-pressure, working with little or no friction, requiring little or no lubrication, securing an absolute steam-tight joint, and applicable to the stuffing-boxes of steam-engines now in use.

In the accompanying drawings, in which letters of reference indicate like parts, Figure 1 is a longitudinal section embodying my invention, showing it in its application with so much of a cylinder-head as is necessary for that purpose. Fig. 2 is a vertical transverse section of the same on lines $x\ x$, $y\ y$, $z\ z$.

Referring to the accompanying drawings, A represents the piston-rod; B, cylindrical socket-cases, that are provided with annular exterior recesses, on which the periphery of the preceding is made to fit, as shown at C, forming independent and separate compartments. Into each compartment are fitted Babbitt or other suitable metal rings D D', cut only in one place and arranged to break joints, as shown in Fig. 2, at E.

The ring-sections are retained in place by a small pin secured to brass ring F, which is cut only in one place and arranged to break joints, as shown at G, Fig. 2, in encircling rings D D'.

The ring-sections are retained in contact with piston-rod by means of nickel-plated band-springs H, which are held in position with sufficient freedom to act by small pins secured to periphery of socket-cases, as shown at I, Fig. 2.

It will be noted that the rod has no bearing on the abutments or flanges of socket-cases forming the compartments, and that the ring-sections are fitted to form side joints, accommodating themselves to the rod should it not run true, and, having no lateral bearing, will not be forced against one side of the rod and wear unevenly should there be any deflection from the axial line when the engine is passing dead-centers, or imperfect adjustment of piston or cross-head.

It will also be noticed that the first socket-case is turned to fit bottom of stuffing-box, as shown at J, Fig. 1, and provided with soft-copper-wire rings, which makes, when screwed up with the gland, a perfect tight joint, preventing any escape of steam over the outside of cases and cylinder-head; also, that the last one is provided with a cover, as shown at K.

It will be obvious that one, two, three, or more sections may be used to meet the requirements of the case, and the several sections form a whole which can be readily inserted into any stuffing-box secured by the gland adapted thereto, the latter being used, if needed, without alteration.

Having thus described my invention, I claim as new and desire to secure by Letters Patent—

1. The combination, with the piston-rod A and cut rings, D, D', and F, of a series of socket-cases, B, having annular exterior recesses to fit the periphery of the preceding socket-case, forming any number of compartments, all constructed as shown and described.

2. The combination of the socket-case B, cut rings D, D', and F, retaining-springs H, and pins I, all constructed and arranged as shown, and for the purpose specified.

ALFRED WILKINSON.

Witnesses:
OWEN MACDONALD,
THOMAS A. REA.